(12) United States Patent
Fujikura et al.

(10) Patent No.: US 12,155,163 B2
(45) Date of Patent: Nov. 26, 2024

(54) BUS BAR AND WIRE HARNESS

(71) Applicant: SUMITOMO WIRING SYSTEMS, LTD., Yokkaichi (JP)

(72) Inventors: Masaya Fujikura, Yokkaichi (JP); Takuya Omura, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 474 days.

(21) Appl. No.: 17/442,063

(22) PCT Filed: Oct. 4, 2019

(86) PCT No.: PCT/JP2019/039260
§ 371 (c)(1),
(2) Date: Sep. 22, 2021

(87) PCT Pub. No.: WO2020/194804
PCT Pub. Date: Oct. 1, 2020

(65) Prior Publication Data
US 2022/0173556 A1 Jun. 2, 2022

(30) Foreign Application Priority Data
Mar. 28, 2019 (JP) ................. 2019-064325

(51) Int. Cl.
H01R 25/00 (2006.01)
B60R 16/02 (2006.01)
H01M 50/298 (2021.01)
H01M 50/50 (2021.01)
H01M 50/503 (2021.01)
H01M 50/517 (2021.01)
(Continued)

(52) U.S. Cl.
CPC ....... *H01R 25/162* (2013.01); *B60R 16/0207* (2013.01); *H01M 50/298* (2021.01); *H01M 50/50* (2021.01); *H01M 50/503* (2021.01); *H01M 50/517* (2021.01); *H01R 4/34* (2013.01); *H01M 2220/20* (2013.01)

(58) Field of Classification Search
CPC ...... H01R 25/162; H01R 3/34; B60R 16/0207
See application file for complete search history.

(56) References Cited

U.S. PATENT DOCUMENTS 5,711,688 A 1/1998 Matsunaga et al.
6,340,319 B1 1/2002 Matsunaga
(Continued)

FOREIGN PATENT DOCUMENTS

JP H06-064362 U 9/1994
JP H08-315890 A 11/1996
(Continued)

OTHER PUBLICATIONS

Dec. 3, 2019 International Search Report issued in International Patent Application No. PCT/JP2019/039260.

*Primary Examiner* — Phuong Chi Thi Nguyen
(74) *Attorney, Agent, or Firm* — Oliff PLC

(57) ABSTRACT

A bus bar that includes a main body having a plate shape for arranging a terminal to be electrically connected to the bus bar; and an upright provided at a side in a widthwise direction of the main body, wherein: the main body has an open hole into which a shaft of a bolt is to be inserted, and the upright has an inner surface with which a head of the bolt can come into contact in a rotational direction.

5 Claims, 4 Drawing Sheets

(51) Int. Cl.
*H01R 4/34* (2006.01)
*H01R 25/16* (2006.01)

(56) References Cited

U.S. PATENT DOCUMENTS

| 2014/0027170 | A1 | | 1/2014 | Shimadu et al. | |
|---|---|---|---|---|---|
| 2018/0109040 | A1 | * | 4/2018 | Iizuka et al. | H02G 3/088 |
| 2018/0166840 | A1 | * | 6/2018 | Okazaki | H01R 4/185 |

FOREIGN PATENT DOCUMENTS

| JP | 2001-196046 A | 7/2001 |
|---|---|---|
| JP | 3104579 U | 9/2004 |
| JP | 2012-049504 A | 3/2012 |
| JP | 2012-089788 A | 5/2012 |
| JP | 2018-064428 A | 4/2018 |
| JP | 2018-170098 A | 11/2018 |

* cited by examiner

BUS BAR AND WIRE HARNESS

BACKGROUND

The present disclosure relates to a bus bar and a wire harness.

JP 2018-170098A describes a fixing structure for a bus bar and a terminal. In this fixing structure, the bus bar is arranged on an electrode pole side of a battery in order to connect a plurality of batteries in a battery pack, and the terminal is arranged on a surface of the bus bar in order to detect the voltage of the battery.

In this fixing structure for a bus bar and a terminal, an electrode pole of the battery is inserted into an open hole in the bus bar, and the electrode pole of the battery is inserted into an open hole in the terminal. A nut is then fastened to the electrode pole of the battery, the terminal is fixed to the bus bar, and the bus bar and the terminal are electrically connected.

JP 2018-170098A also describes a detent for the terminal for use when the nut is fastened.

SUMMARY

In the above fixing structure described in JP 2018-170098A, the bus bar is fastened by the nut to the electrode pole of the battery, which is not rotatable. The inventor of the present application studied a fixing structure for fixing a bus bar to a rotatable bolt. The inventor of the present application examined a reference example in which, when a nut is fastened, an anti-rotation wall portion that comes into contact with a polygonal head portion of the bolt is provided in a housing made of synthetic resin for supporting or accommodating the bus bar, thereby suppressing rotation of the bolt. However, the inventor of the present application noticed that, in this reference example, the fastening of the nut causes corner portions of the polygonal head portion of the bolt to scrape or deform the anti-rotation wall portion of the housing, causing the bolt and the nut to corotate.

An exemplary aspect of the disclosure provides a bus bar with which corotation of the bolt and the nut can be suppressed, and a wire harness.

A bus bar according to one aspect of the present disclosure includes a main body having a plate shape for arranging a terminal to be electrically connected to the bus bar; and an upright provided at a side in a widthwise direction of the main body, wherein: the main body has an open hole into which a shaft of a bolt is to be inserted, and the upright has an inner surface with which a head of the bolt can come into contact in a rotational direction.

A wire harness according to one aspect of the present disclosure includes a first electric wire, a second electric wire, and a bus bar, and the first electric wire is electrically connected to the second electric wire via the bus bar.

According to the present disclosure, it is possible to provide a bus bar with which corotation of the bolt and the nut can be suppressed, and a wire harness.

DETAILED DESCRIPTION OF EMBODIMENTS

Description of Embodiment of Present Disclosure

Figure 1:
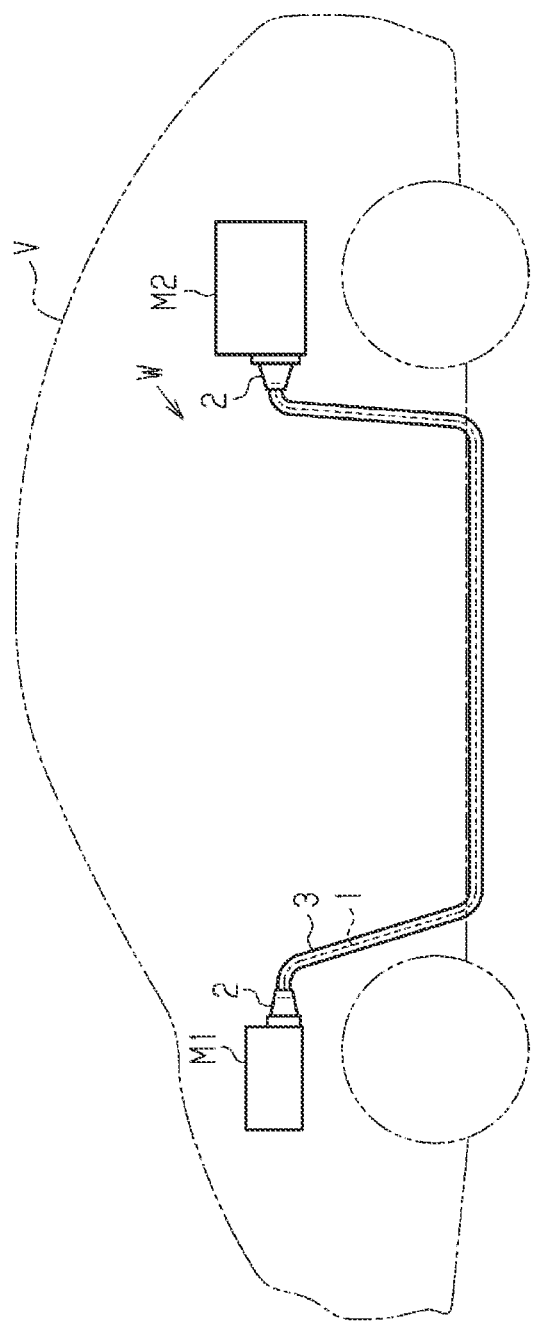
FIG. 1 is a schematic configuration diagram that illustrates an example of a typical configuration of a wire harness according to an embodiment.

Firstly, embodiments of the present disclosure will be listed and described.

[1] A bus bar according to one aspect of the present disclosure is a bus bar formed by bending a plate-shaped metal material, and includes: a main body portion having a plate shape for arranging a connected member to be electrically connected to the bus bar; and an upright portion provided at a side portion in a widthwise direction of the main body portion, wherein the main body portion has an open hole into which a shaft portion of a bolt is to be inserted, and the upright portion has an inner surface with which a head portion of the bolt can come into contact in a rotational direction.

When the connected member is arranged on the main body portion of the bus bar to achieve fixing and electrical connection, the head portion of the bolt starts to corotate with the nut when the nut is fastened to the shaft portion of the bolt. However, further rotation of the bolt is restricted due to the head portion of the bolt coming into contact with the inner surface of the upright portion of the bus bar in the rotational direction, making it possible to suppress the corotation of the bolt and the nut. In addition, since the upright portion that restricts the rotation of the bolt is formed as a portion of the bus bar, which is made of metal, and is highly rigid, the rotation of the bolt can be restricted more reliably than in a mode in which the rotation is restricted by a member made of resin.

[2] It is preferable that the main body portion has a recessed portion adjacent to the upright portion. This is because the recessed portion adjacent to the upright portion is a recessed portion formed by means of a striking process, and it is possible to eliminate the concern that the bending angle of the upright portion will deviate from a desired or designed angle, e.g., 90 degrees, due to spring-back, as a result of the recessed portion being provided in the main body portion, i.e., as a result of the upright portion being bent with respect to the main body portion by means of the striking process. Further, a curved portion is not formed at an inner corner portion between the main body portion and the upright portion that are bent by means of the striking process, or even if a curved portion is formed, the curved portion is extremely small and fits in the recessed portion. Therefore, the head portion of the bolt can be prevented from riding on the curved portion of the inner corner portion. Further, it is because the rotation of the bolt can be restricted more reliably because the upright portion for restricting rotation can also be provided near the head portion of the bolt without worrying about the curved portion of the inner corner portion.

[3] It is preferable that the upright portion has first and second upright portions, and the first and second upright portions respectively have first and second inner surfaces with which the head portion of the bolt can come into contact in the rotational direction. This is because it is possible to more reliably restrict the rotation of the bolt and more reliably suppress the corotation of the bolt and the nut by causing the head portion of the bolt to come into contact with both the first and second inner surfaces, and in particular, to come into contact therewith simultaneously. Note that it is conceivable that the first and second inner surfaces are arranged so as to be parallel with each other or intersect each other.

[4] It is preferable that the first and second upright portions oppose each other with the open hole therebetween, and are arranged so as to at least partially overlap with each other in a lengthwise direction of the main body portion in a side view of the main body portion. This is because the rotation of the head portion of the bolt can be more reliably restricted by the first and second upright portions located on respective sides of the head portion, due to the arrangement in which the first and second upright portions oppose each other with the open hole therebetween, i.e., oppose each other with the head portion of the bolt therebetween, and at least partially overlap with each other in the lengthwise direction of the main body portion of the bus bar.

[5] It is preferable that the head portion of the bolt has a quadrangular column shape, and the first and second inner surfaces are configured such that two diagonal corner portions of the head portion having the quadrangular column shape can both come into contact with the first and second inner surfaces. This is because the rotational force that acts on the bolt when the nut is fastened can be equally received at two diagonal points on the head portion of the bolt due to the two corner portions of the head portion of the bolt that are located diagonally coming into contact with both the first and second inner surfaces.

[6] It is preferable that the main body portion has a first cutout adjacent to the first upright portion, and a second cutout adjacent to the second upright portion, and the first cutout and the second cutout are provided at different positions in the lengthwise direction so as not to overlap with each other in the lengthwise direction in a side view of the main body portion. If, for example, the first cutout and the second cutout are provided at the same position in the lengthwise direction of the main body portion so as to overlap with each other in the lengthwise direction, unlike the bus bar according to one aspect of the present disclosure, the conductor cross-sectional area (the cross-sectional area of the main body portion of the bus bar) orthogonal to the lengthwise direction of the main body portion decreases at the portions at which the cutouts are provided. Then, the electrical resistance increases at the portions at which the conductor cross-sectional area decreases, and the amount of heat generated by the bus bar increases. In this respect, in the bus bar according to one embodiment of the present disclosure, the first cutout and the second cutout are provided at different positions in the lengthwise direction of the main body portion so as not to overlap with each other in the lengthwise direction. Accordingly, the conductor cross-sectional area can be increased at the portions at which the cutouts are provided compared with the case where the first cutout and the second cutout are provided at the same position in the lengthwise direction of the main body portion. That is to say, with the bus bar according to one aspect of the present disclosure, it is possible to suppress an increase in the electrical resistance of the main body portion of the bus bar and suppress an increase in the amount of heat generated by the main body portion of the bus bar at the portions at which the cutouts are provided, compared with the case where the first cutout and the second cutout are provided at the same position in the lengthwise direction of the main body portion.

[7] A wire harness according to one aspect of the present disclosure includes a first electric wire, a second electric wire, and a bus bar, and the first electric wire is electrically connected to the second electric wire via the bus bar.

Use of the above-described bus bar makes it possible to provide a wire harness with which corotation of the bolt and the nut can be suppressed.

Details of Embodiment of Present Disclosure

Specific examples of the bus bar and the wire harness of the present disclosure will be described below with reference to the drawings. Note that the present disclosure is not limited to these examples but is described by the claims, and is intended to include all modifications made within the meaning and scope equivalent to the claims. In the drawings, some of the configurations may be exaggerated or simplified for convenience of description. The dimensional ratio between portions may differ from the real ratio.

A wire harness W shown in FIG. 1 electrically connects two or three or more electrical devices to each other. For example, the wire harness W electrically connects an inverter M1, which is installed in a front portion of a vehicle V, such as a hybrid vehicle or an electric vehicle, and a high-voltage battery M2, which is installed on a back side of the inverter M1 in the vehicle V, to each other. For example, the wire harness W is laid out to pass under the floor or the like of the vehicle V. The invertor M1 is connected to a motor for driving wheels that serves as a motive power source for vehicle driving. The inventor M1 generates AC power from DC power of the high-voltage battery M2, and supplies the AC power to the motor. The high-voltage battery M2 is, for example, a battery capable of supplying a voltage of several hundred volts.

The wire harness W has a conductive path 1, connectors 2 that are attached to two end portions of the conductive path 1, and a protecting tube 3 that surrounds the conductive path 1. For example, the conductive path 1 is formed in an elongated shape, extending in the front-back direction of the vehicle V. For example, the conductive path 1 can be formed with a high-voltage wire that is capable of dealing with high voltage and large current. For example, the conductive path 1 is formed by electrically connecting a plurality of electric wires W1 and W2 (which may also be referred to as divided electric wires; see FIG. 6), each of which are shorter than the entire length of the conductive path 1, via a relay connecting member, which may be a later-described bus bar 10. In the example in FIG. 1, one end portion of the conductive path 1 is connected to the inverter M1 via a connector 2, and the other end portion of the conductive path 1 is connected to the high-voltage battery M2 via a connector 2. The number of conductive paths 1 and the number of connectors 2 are determined in advance in accordance with the type and the number of electrical devices to be electrically connected by the wire harness W, for example.

The protecting tube 3 may have a shape appropriate for the shape in the lengthwise direction of the conductive path 1. The protecting tube 3 may be configured to surround the entire conductive path 1 or only a predetermined length range. In one example, the conductive path 1 may be a bundle of a plurality of conductive paths 1. In this case, the protecting tube 3 may be configured to collectively surround the bundle of the plurality of conductive paths 1, or may be configured to surround one or more conductive paths in the bundle of the plurality of conductive paths 1. In another example, the conductive path 1 may be a branch conductive path that includes a main line and one or more branch lines.

In this case, the branch conductive path may have one or more conductive base ends, each of which is one end of the main line or each of the one or more branch lines, and one or more conductive terminals, each of which is the other end of the main line or each of the one or more branch lines. The protecting tube 3 may be configured to surround only the main line, only the branch lines, or both the main line and the branch lines.

Figure 2A:
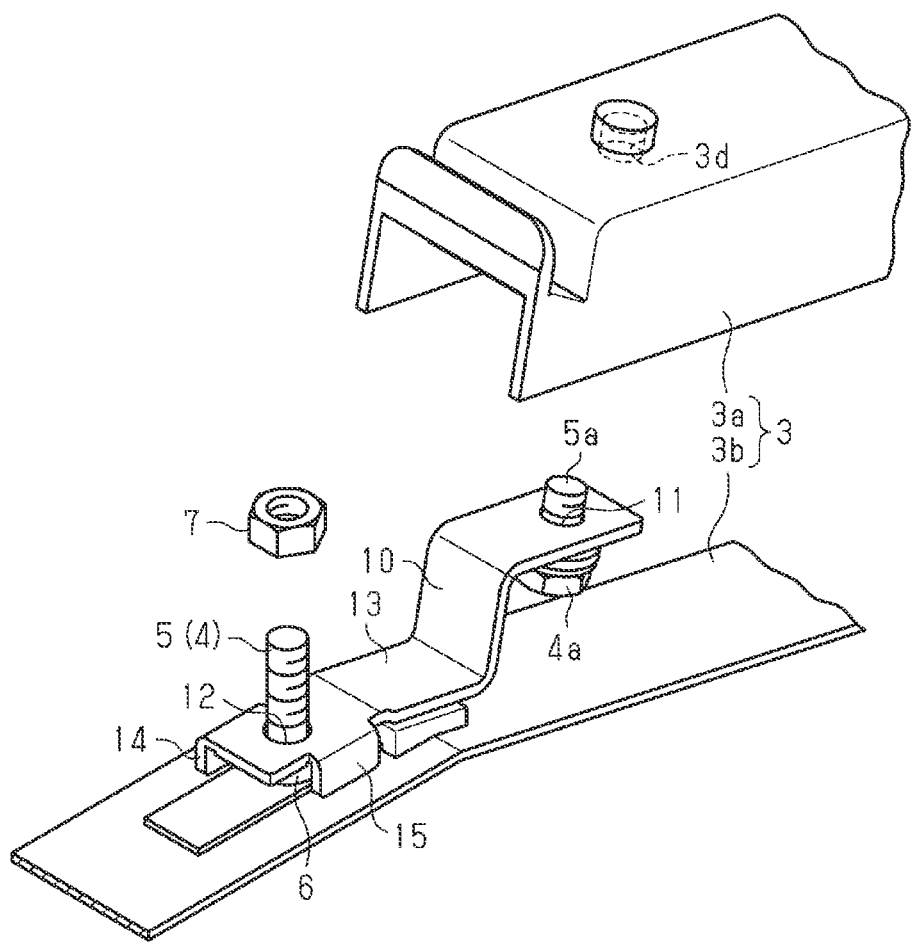
FIG. 2A is a perspective view of a fastening structure for a bus bar that uses a bolt and a nut.

In the example shown in FIG. 2A, the protecting tube 3 has a case 3a and a cover 3b. The case 3a and the cover 3b may be separate synthetic resin parts. For example, the protecting tube 3 protects the conductive path 1 from flying objects and water droplets. The protecting tube 3 may be, for example, a pipe that is made of metal or resin, a flexible corrugated tube that is made of resin or the like, a water-proofing cover that is made of rubber, or a combination thereof.

Figure 4:
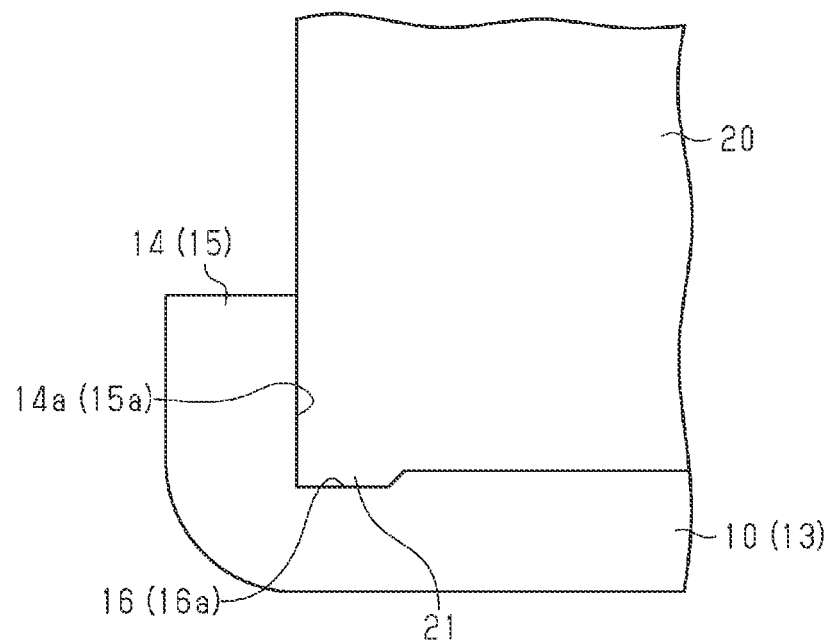
FIG. 4 is a schematic diagram that illustrates a process of forming an upright portion of the bus bar using a flange punch.
Figure 5:
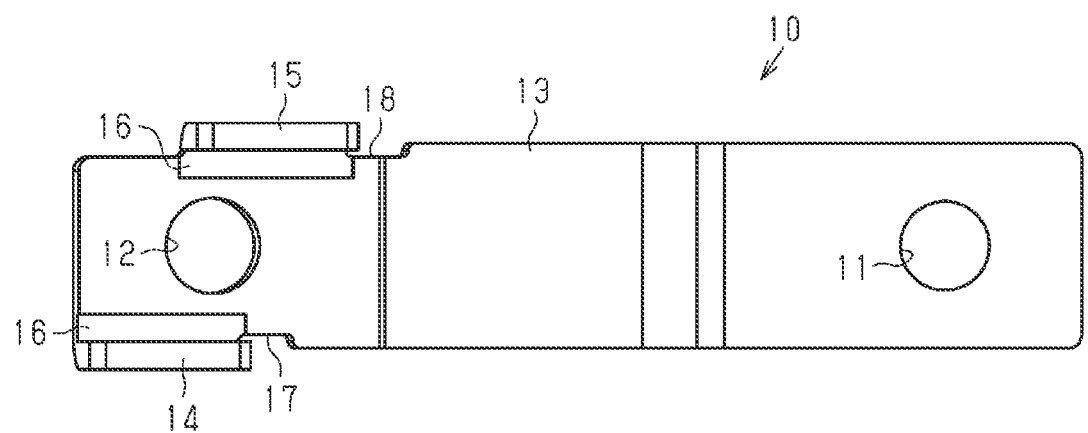
FIG. 5 is a plan view of the bus bar.
Figure 6:
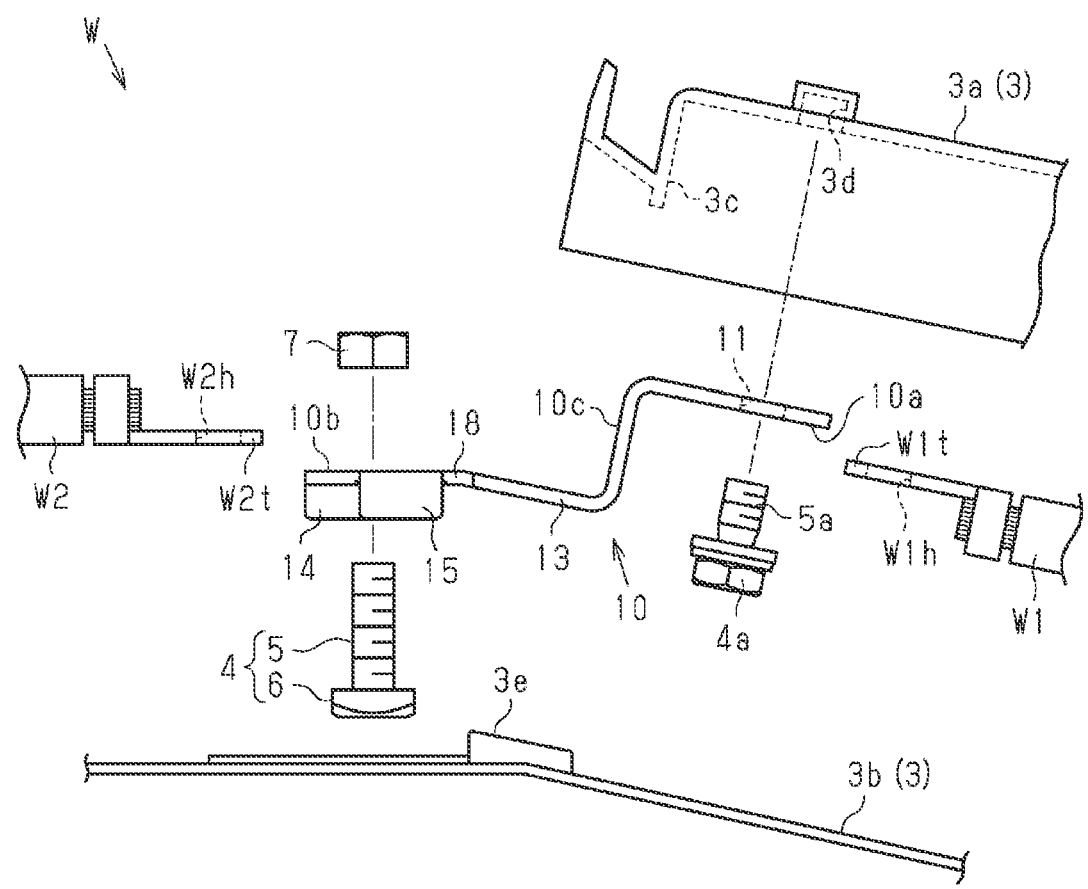
FIG. 6 is a side view of a wire harness for illustrating electrical and mechanical connection between the bus bar and an electric wire.

In the example shown in FIGS. 2A to 6, the bus bar 10 is for electrically connecting the two divided electric wires W1 and W2, which constitute a part of or the entirety, in the lengthwise direction, of the conductive path 1. As shown in FIG. 6, the bus bar 10 is configured to electrically connect a conductive end portion of the first electric wire W1 and a conductive end portion of the second electric wire W2 to each other, and may be called a relay connecting portion. The conductive end portion of the first electric wire W1 may be, for example, a first terminal W1t that has an open hole W1h. The conductive end portion of the second electric wire W2 may be, for example, a second terminal W2t that has an open hole. The bus bar 10 can be supported or fixed by the protecting tube 3 that is formed by the case 3a and the cover 3b.

The bus bar 10 can be configured as a one-piece product that is made of a conductive material. The bus bar 10 is formed by bending a plate-shaped metal material. Circular open holes 11 and 12 are formed at respective end portions in the lengthwise direction of the bus bar 10. As shown in FIG. 6, a shaft portion 5a of a bolt 4a is inserted into the open hole 11 formed at one end portion of the bus bar 10. The shaft portion 5a of this bolt 4a is inserted into the open hole W1h in the first terminal W1t, and the first terminal W1t is arranged on a surface (a later-described first terminal base or first terminal support surface 10a) of the bus bar 10. The bolt 4a is fastened to a bolt hole 3d, which is formed in an inner surface of the case 3a. Thus, the bus bar 10 is fixed to the case 3a together with the first terminal W1t.

Figure 2B:
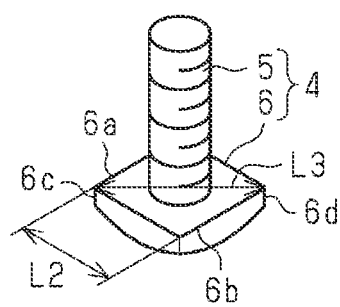
FIG. 2B is s perspective view of the bolt.
Figure 3:
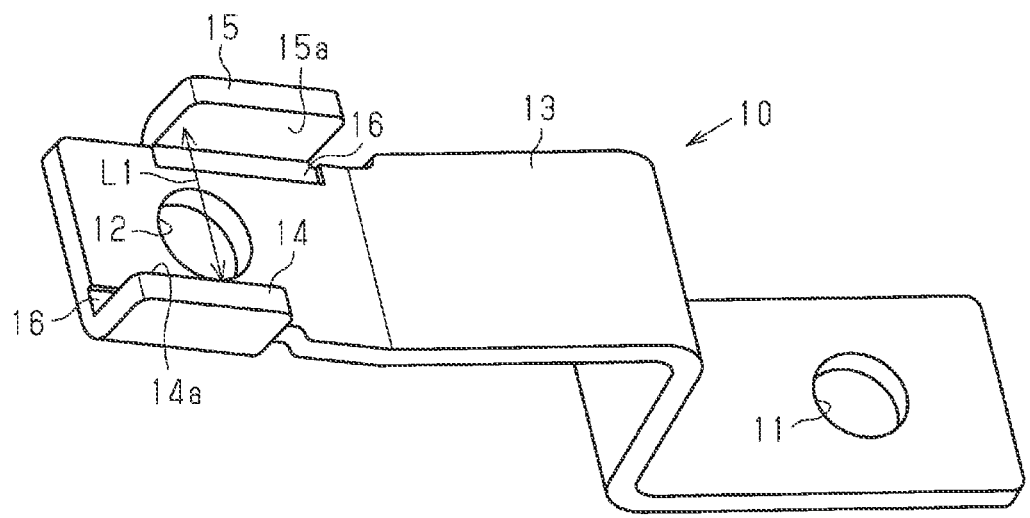
FIG. 3 is a perspective view of the bus bar.

A shaft portion 5 (shaft) of a bolt 4 is inserted into the open hole 12 formed at the other end portion of the bus bar 10. The shaft portion 5 of the bolt 4 is then inserted into the open hole W2h in the second terminal W2t (a connected member), and the second terminal W2t is arranged on a surface (a later-described second terminal base or second terminal support surface 10b) of the bus bar 10. A nut 7 is fastened to the shaft portion 5. Thus, the bus bar 10 and the second terminal W2t are electrically connected, and the second terminal W2t is fixed to the bus bar 10. As shown in FIG. 2B, the bolt 4 may have a head portion 6 (head) that has a quadrangular column shape, for example.

The bus bar 10 is configured to suppress corotation of the bolt 4 and the nut 7. This configuration of the bus bar 10 is advantageous in that an anti-rotation wall portion for preventing the rotation of the bolt 4 does not need to be provided on the cover 3b, the structure of the cover 3b can be simplified, and the molding cost for forming the cover 3b can be reduced, or in that the head portion 6 having a quadrangular column shape can be prevented from, for example, scraping the resin cover 3b when the nut 7 is fastened to the shaft portion 5 of the bolt 4.

The bus bar 10 has a main body portion 13 (main body) having a plate shape that has the open holes 11 and 12, and upright portions 14 and 15 (uprights) that are provided on respective sides in the widthwise direction of the main body portion 13 so as to sandwich the open hole 12. The upright portions 14 and 15 are arranged so as to partially overlap with each other in the lengthwise direction of the main body portion 13 in a side view the main body portion 13. The upright portion 14 corresponds to an example of a first upright portion, and the upright portion 15 corresponds to an example of a second upright portion.

The bus bar 10 is arranged such that the upright portions 14 and 15 are arranged so as to face down from the main body portion 13 toward the cover 3b. The head portion 6 of the bolt 4 is located in a region corresponding to the height of the upright portions 14 and 15. The is to say, the thickness of the head portion 6 of the bolt 4 is smaller than the height of the upright portions 14 and 15. The shaft portion 5 of the bolt 4 penetrates the open hole 12 and protrudes upward. The head portion 6 has two side surfaces 6a and 6b that sandwiches the shaft portion 5. The side surface 6a opposes an inner surface 14a of the upright portion 14. The side surface 6b opposes an inner surface 15a of the upright portion 15. The inner surface 14a corresponds to an example of a first inner surface, and the inner surface 15a corresponds to an example of a second inner surface.

The head portion 6 having the quadrangular column shape has two corner portions 6c and 6d (corners), which are located diagonally. The positions and the dimensions of the upright portions 14 and 15 of the bus bar 10 are set such that, when the nut 7 is fastened to the shaft portion 5 of the bolt 4, the corner portion 6c comes into contact with the inner surface 14a and the corner portion 6d comes into contact with the inner surface 15a to restrict rotation of the bolt 4. That is to say, a length L2 (see FIG. 2B) between the side surfaces 6a and 6b of the head portion 6 of the bolt 4 is smaller than a gap L1 (see FIG. 3) between the inner surfaces 14a and 15a of the upright portions 14 and 15 of the bus bar 10 (L2<L1), and a length L3 between the corner portions 6c and 6d of the head portion 6 is larger than the gap L1 (L3>L1). The relationship between the gap L1 and the lengths L2 and L3 is set so as to establish dimensions according to which L3>L1>L2 is satisfied.

Production of the bus bar 10 will be described. In a state where the flange punch 20 is set on an upper surface of the main body portion 13 as shown in FIG. 4, both end sides in the widthwise direction of the main body portion 13 are bent along the shape of corner portions of the flange punch 20, and thus the upright portions 14 and 15 are formed. In order to perform a bending process by means of a striking process, the flange punch 20 is provided with a protrusion 21, which protrudes downward, at each corner portion (one corner portion with which the bending is performed) of the flange punch 20.

That is to say, the upright portions 14 and 15 are bent from the main body portion 13 according to the shape of the corner portions of the flange punch 20, with the bus bar 10 pressed by the protrusions 21. As a result, striking recessed portions 16 (recesses), which correspond to the protrusions 21, are formed as traces of the striking process at portions of the main body portion 13 that are adjacent to the upright portions 14 and 15. The bending angle of the upright portions 14 and 15 that are bent from the main body portion 13 by means of the striking process can be maintained at a desired or designed angle (e.g., 90 degrees), due to the characteristic of the striking process that spring-back is unlikely to occur. In addition, no curved portion is formed at inner corner portions between the main body portion 13 and the upright portions 14 and 15 that are bent by means of the striking process, or even if curved portions are formed, these curved portions are extremely small, and therefore the curved portions fit in the recessed portions 16. Note that, for example, the width of each striking recessed portion 16 is set to be about the same as the plate thickness of the bus bar 10, and the depth of each striking recessed portion 16 is adjusted as appropriate.

As shown in FIG. 5, the main body portion 13 has a first cutout 17, which is adjacent to the upright portion 14, and a second cutout 18, which is adjacent to the upright portion 15. The first cutout 17 is a portion that is needed to form the upright portion 14 using the flange punch 20. Similarly, the second cutout 18 is a portion that is needed to form the upright portion 15 using the flange punch 20. The first cutout 17 and the second cutout 18 are provided at different positions in the lengthwise direction so as not to overlap with each other in the lengthwise direction of the main body portion 13.

As shown in FIG. 6, the protecting tube 3 may have a bus bar positioning structure (3c, 3d, 3e) for supporting, fixing, or positioning the bus bar 10. The bus bar positioning structure may include an inner step surface 3c and a bolt hole 3d, which are formed in the case 3a, and a bus bar base 3e, which is formed in the cover 3b. The inner step surface 3c of the case 3a is configured to position the bus bar 10 in the lengthwise direction. The bolt hole 3d fixes the bus bar 10 to the case 3a in cooperation with the bolt 4a. The bus bar base 3e of the cover 3b is configured to position the bus bar 10 in the widthwise direction or come into contact with the bus bar 10 and press the bus bar 10 against the case 3a.

As shown in FIG. 6, the bus bar 10 may have a first terminal base or first terminal support surface 10a for supporting the first terminal W1t of the first electric wire W1, and a second terminal base or second terminal support surface 10b for supporting the second terminal W2t of the second electric wire W2. The first terminal support surface 10a may be a portion of a first surface of the plate-shaped main body portion 13, and the second terminal support surface 10b may be a portion of a second surface of the plate-shaped main body portion 13, the second surface being on the side opposite to the first surface. As shown in FIG. 6, the bus bar 10 may have a step or a bent portion 10c, which is configured to form a height gap that is larger than or equal to the thickness of the wire harness W at an intermediate portion between the first terminal support surface 10a and the second terminal support surface 10b in the lengthwise direction. This bent portion 10c can be formed by bending the intermediate portion in the lengthwise direction of the main body portion 13. The bent portion 10c may be configured to come into direct contact or surface contact with the inner step surface 3c of the case 3a. The bent portion 10c of the bus bar 10 can provide a stopper surface or a positioning surface for preventing relative movement of the bus bar 10 and the case 3a in the lengthwise direction. The first terminal support surface 10a and the second terminal support surface 10b may be configured to substantially support, in-line, the first terminal W1t of the first electric wire W1 and the second terminal W2t of the second electric wire W2.

After one of or both the first electric wire W1 and the second electric wire W2 are connected to the bus bar 10, the cover 3b is joined to the case 3a in a fixed manner. The cover 3b and the case 3a may be joined by any joint means such as snap-fit. When the cover 3b and the case 3a are joined, the bus bar 10 is positioned and fixed between the cover 3b and the case 3a. The bus bar positioning structure (3c, 3d, 3e) is advantageous in reducing rattling of the bus bar 10 in the protecting tube 3.

As described above, according to the present embodiment, the following effects can be achieved.

(1) Although the head portion 6 of the bolt 4 starts to corotate with the nut 7 when the nut 7 is fastened to the shaft portion 5 of the bolt 4, further rotation of the bolt 4 is restricted due to the head portion 6 of the bolt 4 coming into contact, in the rotational direction, with the inner surfaces 14a and 15a of the upright portions 14 and 15 of the bus bar 10. Thus, the corotation of the bolt 4 and the nut 7 can be suppressed. Further, since the upright portions 14 and 15 that restrict the rotation of the bolt 4 are each formed by a portion of the bus bar 10, which is made of metal, and are also highly rigid, the rotation of the bolt 4 can be more reliably restricted than in the mode of restricting the rotation using a member that is made of resin.

(2) Since the main body portion 13 is provided with the striking recessed portions 16 adjacent to the upright portions 14 and 15, i.e., the upright portions 14 and 15 are bent with respect to the main body portion 13 by means of the striking process, it is possible to eliminate the concern that the bending angle of the upright portions 14 and 15 will deviate from a desired or designed angle, e.g., 90 degrees, due to spring-back. Note that the spring-back refers to a phenomenon in which deformation applied to the material slightly returns to its original state when the flange punch 20 is removed. Further, no curved portion is formed at inner corner portions between the main body portion 13 and the upright portions 14 and 15 that are bent by means of the striking process, or even if curved portions are formed, these curved portions are extremely small and fit in the recessed portions 16. Thus, the head portion 6 of the bolt 4 can be prevented from riding on the curved portions of the inner corner portions. In addition, since the upright portions 14 and 15 for restricting the rotation can be provided near the head portion 6 of the bolt 4 without worrying about the curved portions at the inner corner portions, the rotation of the bolt 4 can be more reliably restricted.

(3) As a result of the head portion 6 of the bolt 4 coming into contact with both the inner surfaces 14a and 15a of the upright portions 14 and 15, and in particular, coming into contact therewith simultaneously, it is possible to more reliably restrict the rotation of the bolt 4 and more reliably suppress the corotation of the bolt 4 and the nut 7.

(4) Since the upright portions 14 and 15 oppose each other with the open hole 12 therebetween, i.e., oppose each other with the head portion 6 of the bolt 4 therebetween, and are arranged so as to partially overlap with each other in the lengthwise direction of the main body portion 13 of the bus bar 10, the rotation of the head portion 6 of the bolt 4 can be more reliably restricted by the upright portions 14 and 15 located on respective sides of the head portion 6.

(5) Due to the two corner portions 6c and 6d located diagonally on the head portion 6 of the bolt 4 both coming into contact with the inner surfaces 14a and 15a, the rotational force that acts on the bolt 4 when the nut 7 is fastened can be equally received at two diagonal portions of the head portion 6.

(6) For example, if, unlike the bus bar 10 of the present embodiment, the first cutout 17 and the second cutout 18 are provided at the same positions in the lengthwise direction so as to overlap with each other in the lengthwise direction of the main body portion 13, the conductor cross-sectional area (the cross-sectional area of the main body portion 13 of the bus bar 10) orthogonal to the lengthwise direction of the main body portion 13 decreases at the portions at which the cutouts 17 and 18 are provided. Then, the electrical resistance increases at the portions at which the conductor cross-sectional area decreases, and the amount of heat generated by the bus bar increases. In this respect, in the bus bar 10 of the present embodiment, the first cutout 17 and the second cutout 18 are provided at different positions in the lengthwise direction of the main body portion 13 so as not to overlap with each other in the lengthwise direction. Accordingly, the conductor cross-sectional area at the portions at which the cutouts 17 and 18 are provided can be increased compared with the case where the first cutout 17 and the second cutout 18 are provided at the same position in the lengthwise direction of the main body portion 13. That is to say, according to the bus bar 10 of the present embodiment, it is possible to suppress an increase in electrical resistance in the main body portion 13 of the bus bar 10 and suppress an increase in the amount of heat generated by the main body portion 13 of the bus bar 10 at the portions at which the cutouts 17 and 18 are provided, compared with the case where the first cutout 17 and the second cutout 18 are provided at the same position in the lengthwise direction of the main body portion 13.

(7) By using the bus bar 10, a wire harness W can be provided with which suppressing corotation of the bolt 4 and the nut 7 can be suppressed.

The side surfaces 6a and 6b of the head portion 6 of the bolt 4 may be flat side surfaces. The inner surfaces 14a and 15a of the upright portions 14 and 15 may be flat surfaces that come into surface contact with the flat surfaces of the head portion 6 of the bolt 4, and may be called contact surfaces or stopper surfaces. The upright portions 14 and 15 may be called bolt rotation stopper plates.

Note that the above embodiment can be modified and implemented as follows. The above embodiment and the following modifications can be implemented in combination as long as no technical contradiction arises.

The upright portions 14 and 15 are arranged on respective sides in the widthwise direction of the main body portion 13, and the inner surfaces 14a and 15a are parallel surfaces. Instead, a configuration may alternatively be employed in which one upright portion is provided on one side in the widthwise direction of the main body portion 13, the other upright portion is provided at one end side in the lengthwise direction, and the inner surfaces intersect (are orthogonal to) each other.

It is desirable that the head portion 6 comes into contact with upright portions provided at two or more portions around the open hole 12.

Either one of the upright portions 14 and 15 may be omitted, and the head portion 6 may be configured to come into contact the upright portion at one portion around the open hole 12.

In the above embodiment, the wire harness W electrically connects the inverter M1 and the high-voltage battery M2, but is not limited thereto. The wire harness W need only electrically connect a plurality of electrical devices mounted in the vehicle V, and for example, the wire harness W may electrically connect a low-voltage battery and a relay box.

The invention claimed is:

1. A bus bar, comprising:
a main body having a plate shape for arranging a terminal to be electrically connected to the bus bar; and
a first upright and a second upright provided at opposite sides in a widthwise direction of the main body, wherein:
the main body has an open hole into which a shaft of a bolt is to be inserted,
the first and second uprights respectively have a first inner surface and a second inner surface with which a head of the bolt can come into contact in a rotational direction,
the open hole is separate from the first and second uprights, is spaced from the first and second uprights, and is arranged to at least partially overlap with the first and second uprights in a lengthwise direction of the main body, and
the main body has a first recess adjacent to the first upright and a second recess adjacent to the second upright with the first recess between the open hole and the first upright and the second recess between the open hole and the second upright.

2. The bus bar according to claim 1,
wherein the first and second uprights oppose each other with the open hole therebetween, and are arranged so as to at least partially overlap with each other in a lengthwise direction of the main body in a side view of the main body.

3. The bus bar according to claim 2, wherein:
the head of the bolt has a quadrangular column shape, and
the first and second inner surfaces are configured such that two diagonal corners of the head having the quadrangular column shape can both come into contact with the first and second inner surfaces.

4. The bus bar according to claim 2, wherein:
the main body has a first cutout adjacent to the first upright, and a second cutout adjacent to the second upright, and
the first cutout and the second cutout are provided at different positions in the lengthwise direction so as not to overlap with each other in the lengthwise direction in the side view of the main body.

5. A wire harness comprising:
a first electric wire;
a second electric wire; and
a bus bar comprising:
a main body having a plate shape for arranging a terminal to be electrically connected to the bus bar; and
a first upright and a second upright provided at opposite sides in a widthwise direction of the main body, wherein:
the main body has an open hole into which a shaft of a bolt is to be inserted,
the first and second uprights respectively have a first inner surface and a second inner surface with which a head of the bolt can come into contact in a rotational direction,
the open hole is separate from the first and second uprights, is spaced from the first and second uprights, and is arranged to at least partially overlap with the first and second uprights in a lengthwise direction of the main body,
the main body has a first recess adjacent to the first upright and a second recess adjacent to the second upright with the first recess between the open hole and the first upright and the second recess between the open hole and the second upright, and the first electric wire is electrically connected to the second electric wire via the bus bar.

* * * * *